United States Patent [19]

Suzuki

[11] Patent Number: 4,874,352

[45] Date of Patent: Oct. 17, 1989

[54] FLUIDIC TENSIONER

[75] Inventor: Tadasu Suzuki, Kawagoe, Japan

[73] Assignee: Tsubakimoto Chain Co., Japan

[21] Appl. No.: 172,314

[22] Filed: Mar. 23, 1988

[30] Foreign Application Priority Data

Aug. 6, 1987 [JP] Japan .................................. 62-119784
Oct. 9, 1987 [JP] Japan .................................. 62-154131

[51] Int. Cl.⁴ .............................................. F16H 7/08
[52] U.S. Cl. .................................... 474/110; 474/111; 474/138
[58] Field of Search ............... 474/101, 109, 110, 111, 474/113–115, 133, 135, 136, 138

[56] References Cited

U.S. PATENT DOCUMENTS 3,812,733  5/1974  Yoshida ............................ 474/111
4,708,696  11/1987 Kimura et al. ..................... 474/103

FOREIGN PATENT DOCUMENTS 0049451  5/1981  Japan ................................ 474/111
0059051  5/1981  Japan ................................ 474/111

59-6650  1/1984  Japan .

Primary Examiner—Thuy M. Bui
Attorney, Agent, or Firm—Howson & Howson

[57] ABSTRACT

A hydraulic ball-type check valve tensioner includes a plunger internally provided with an oil chamber and slidably fitted in a housing in association with a spring biasing the plunger in a protruding direction, and a ball-type check valve between the housing and oil chamber to permit oil flows into the oil chamber while blocking oil flow in the reverse direction. A relief valve includes a sleeve slidably fitted in an auxiliary oil chamber in communication with the oil chamber, a spring biasing the sleeve into a depressed position, and a discharge port to be opened when the sleeve is slided against the biasing spring action. A no-return mechanism includes a rack formed on the outer surface of the plunger, and a ratchet rotatably supported in the housing in meshing engagement with the rack and biased by a spring in a direction opposite to the protruding direction.

2 Claims, 4 Drawing Sheets

FLUIDIC TENSIONER

FIELD OF THE INVENTION

This invention relates to fluidic tensioners, and more particularly to a hydraulic ball-type check valve tensioner which is useful for constantly imparting tension to wrapped power transmission devices such as chains, belts and the like.

BACKGROUND OF THE INVENTION

Generally, it is necessary to impart a certain degree of tension to a chain, belt or similar power transmission device to prevent noises or unmeshing of teeth (in case of a toothed belt). On the other hand, some measures have to be provided to remove excessive tensioning forces.

For example, in a known hydraulic ball-type check valve tensioner used for a camshaft drive chain, a plunger is biased in a protruding direction by a spring and tends to press the tensioner according to the degree of slackening of the chain. A clearance is formed between the ball and seat of the check valve to permit free flow of fluid therethrough. Therefore, the hydraulic pressure from an external source such as an oil pump or the like flows into a chamber through passages formed in the housing, advancing the plunger easily by the combined efforts of the hydraulic pressure and the spring force.

On the other hand, when the plunger tends to move in a reverse direction, the ball is tightly contacted with the ball seat to restrict outflow of fluid from the chamber, thereby preventing retraction of the plunger to provide the tensioner with a so-called no-return function.

The "no-return" function means that movements are easy in one direction but difficult in the reverse direction.

However, the above-described tensioner construction fails to maintain a predetermined tension, such as when an engine is idling or at rest with low or no oil pressure. Unless appropriate oil pressure is applied to the chamber or it is filled with sufficient oil, the plunger becomes easily movable in both directions and loses the "no-return" function, producing vibrations and noises due to the failure in maintaining a predetermined degree of tension in the chain.

Accordingly, it is an object of the present invention to provide a tensioner for chain, belt or similar wrapped power transmission devices which can maintain a constant tensioning force with compliance for overtensioning.

It is another object of the present invention to provide a fluidic tensioner which can maintain the tension of a chain or the like even when the fluid pressure to the tensioner is low or zero.

SUMMARY OF THE INVENTION

According to one aspect of the present invention, there is provided a tensioner for a wrapped power transmission device between rotating members. A plunger internally provided with a fluid chamber slidably fits in a housing in assooiation with a spring biasing the plunger in a protruding direction. A check valve between the housing and chamber permits fluid flow into the chamber while blocking flow in the opposite direction. A relief valve within the housing includes a sleeve slidable in an auxiliary fluid chamber in communication with the plunger chamber, a spring urging the sleeve in a retracting direction, and a discharge port opening when the sleeve slides against the action of the spring. The check ball mechanism blocks outflows of fluid when a load is applied to the plunger by a chain or other power transmission device in a direction opposite to the biasing direction, thereby increasing the fluid pressure in the chamber. A pressure equivalent to that in the chamber is transmitted t the sleeve which is slidably fitted in the auxiliary chamber, and when the force as determined by the cross sectional area and the oil pressure at the sleeve becomes greater than the biasing force of the spring, the sleeve gradually retracts. As the pressure is increased further, the sleeve uncovers a discharge port opening to the outside for discharging fluid from the auxiliary chamber eliminating excessive pressure.

According to another aspect of the present invention, a rack is formed on the outer surface of the plunger. A ratchet rotatably supported on the housing in meshing engagement with the rack is biased by a spring in a direction opposite to the protruding direction. The ratchet prevents retraction of the plunger in incremental steps and, after an increase in fluid pressure, prevents stepwise retraction of the plunger to maintain the tension of the chain or the like, thereby functioning as a "no-return" tensioner. Even when the oil pressure does not exist at all, the no-return function is retained, though stepwise, by the operation of the ratchet.

It is possible to employ in combination the abovementioned relief valve with the pressure regulating action and the ratchet with the no-return function.

For a better understanding of these and other objects and aspects of the invention, reference may be made to the following detailed description taken in conjunction with the accompanying drawings wherein:

DESCRIPTION OF THE PREFERRED EMBODIMENTS

Figure 1:
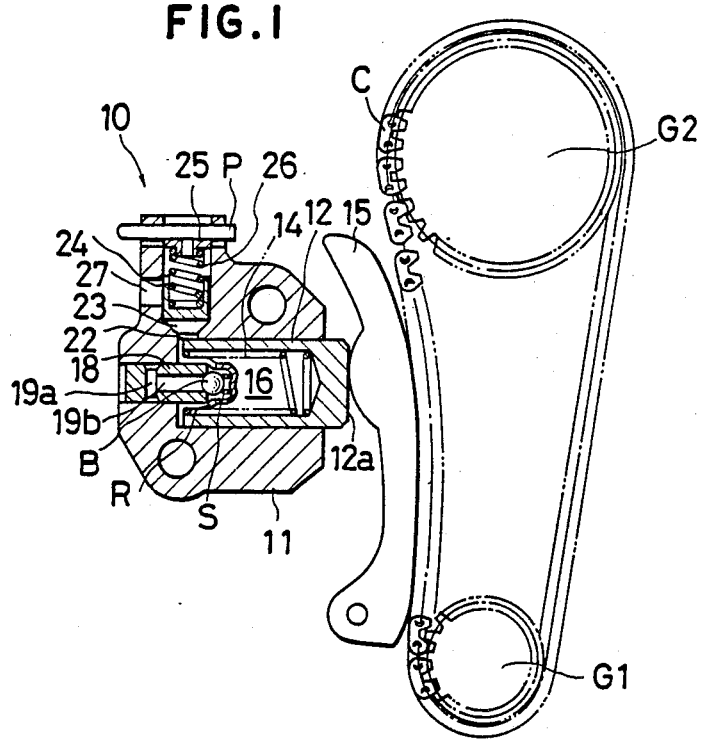
FIG. 1 is a sectional view of a hydraulic ball-type check valve tensioner of a first embodiment of the invention with a relief value in a housing.
Figure 2:
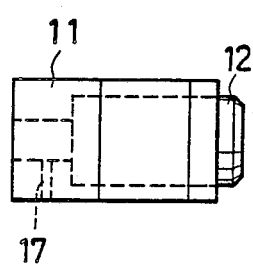
FIG. 2 is a bottom view of the tensioner shown in FIG. 1.
Figure 3:
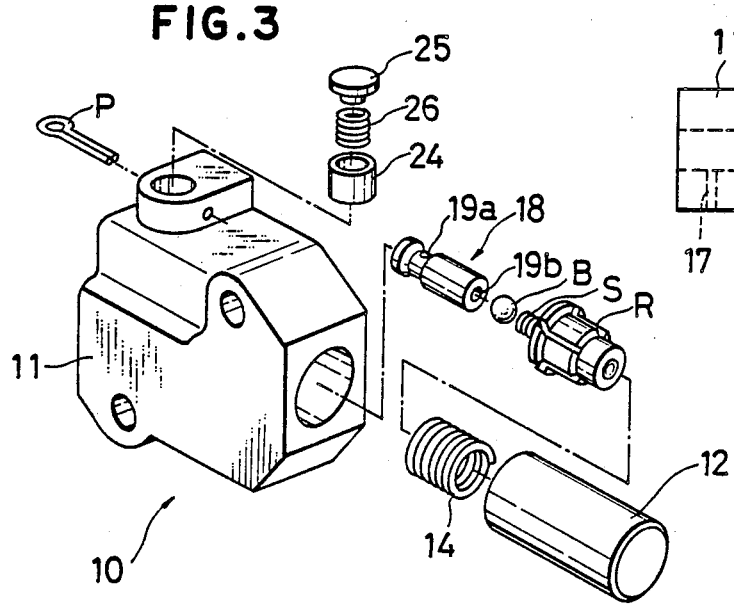
FIG. 3 is an exploded perspective view of the tensioner of FIG. 1.

Referring now to the drawings wherein like characters designate like or corresponding parts throughout the several views, FIGS. 1 to 3 show a hydraulic ball-type check valve tensioner 10 which constitutes a first embodiment of the invention. A hollow cylindrical plunger 12 which has an opening at one end is slidably fitted in a housing 11, and a spring 14 is interposed between the plunger 12 and housing 11 to bias the plunger 12 in the protruding direction, pressing a lever arm 15 with an end face 12a of the plunger 12 to impart tension to a chain C.

The housing 11 is provided with an oil passage 17 (FIG. 2) to supply an oil chamber 16 in the plunger 12 with oil from an oil pump or other oil pressure source, not shown. Oil passages 19a and 19b are also formed in a ball seat 18 to communicate the oil passage 17 of the housing 11 with the oil chamber 16. Check ball B is biased toward the ball seat 18 by a coil spring S which is abutted at one end against a retainer R to form a ball-type check valve which permits oil flow from the oil passage 19b to oil chamber 16 while blocking oil flow in the reverse direction.

The housing 11 is further provided with an auxiliary oil chamber 23 which communicates with the oil chamber 16 through an oil passage 22. A cylindrical sleeve 24 is fitted in the auxiliary oil chamber 23 slidably in contact with the inner walls thereof, and a spring 26 is interposed between the sleeve 24 and a plug 25 which is stopped by a pin P, thereby urging the sleeve 24 into a position blocking a discharge port 27. The oil chamber 16 is communicable with the oil auxiliary oil chamber 23 through the port 27 to discharge oil when the sleeve 24 is moved in the reverse direction by the oil pressure in the oil chamber 16. Thus, a relief valve is formed by these components.

With the tensioner 10 of this embodiment, if a slack occurs to the chain C under engine driving conditions, the plunger 12 protrudes due to the biasing action of the spring 14, and simultaneously the check ball B disengages from the ball seat 18, supplying oil to the oil chamber 16 through the oil passage 17 in the housing 11 and the oil passages 19a and 19b in the ball seat 18 to maintain the tension of the chain C.

In case the chain C is excessively tensioned by thermal elongation of the inter-axle distance of the sprockets $G_1$ and $G_2$ due to engine-generated heat, a pressing load is imposed on the plunger 12 by the arm 15 in a direction reverse to the biasing direction. At this time, the ball-type check valve acts to block the outflow of oil from the oil chamber 16, and the oil, which is a non-compressive fluid, in the oil chamber 16 prevents retraction of the plunger 12. However, the sleeve 24 in the auxiliary oil chamber 23 is subjected to the oil pressure generated in the oil chamber 16, and slides in the retracting direction opposite to the biasing direction to absorb the excessive tension in the chain C. As the sleeve 24 is retracted by a further increase in the pressing load on the plunger 12, the valve opens to communicate the auxiliary oil chamber 23 with the discharge port 27, permitting discharge of oil from the oil chamber 16 and auxiliary oil chamber 23 to eliminate the excessive tension of the chain C. If the oil pressure is dropped by this oil discharge, the sleeve 24 slides due to the biasing action of the spring to close the discharge port 27 and to maintain the oil chamber 16 at a predetermined level. In case the oil pressure is lowered excessively, the ball-type chech valve acts to draw oil into the oil chamber 16 to return the oil pressure to a normal level.

Once the tensioner 10 attains a normal tensioning force, it functions as a constant tensioner without any drop of the oil pressure in the oil chamber 16, even when the engine is turned off and the oil supply is stopped.

Figure 4:
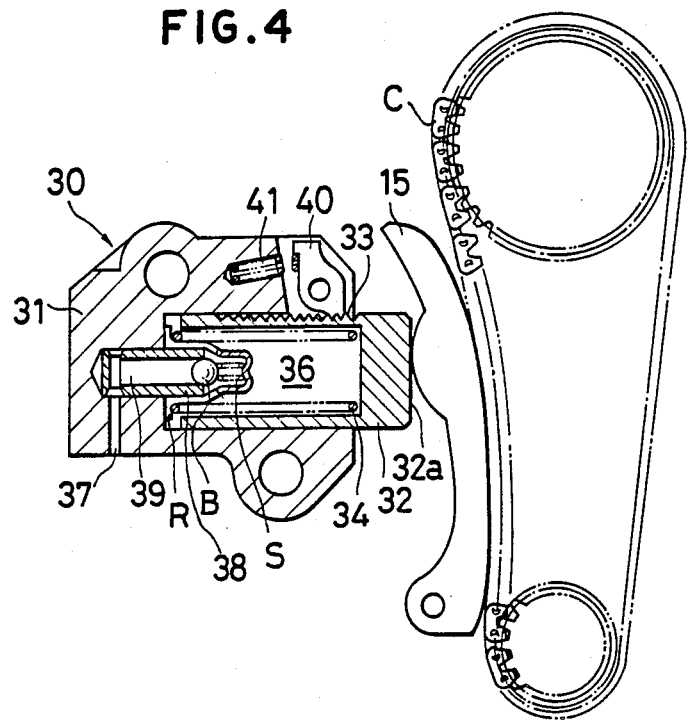
FIG. 4 is a sectional view of a hydraulic ball-type check valve tensioner of a second embodiment employing a ratchet.
Figure 5:
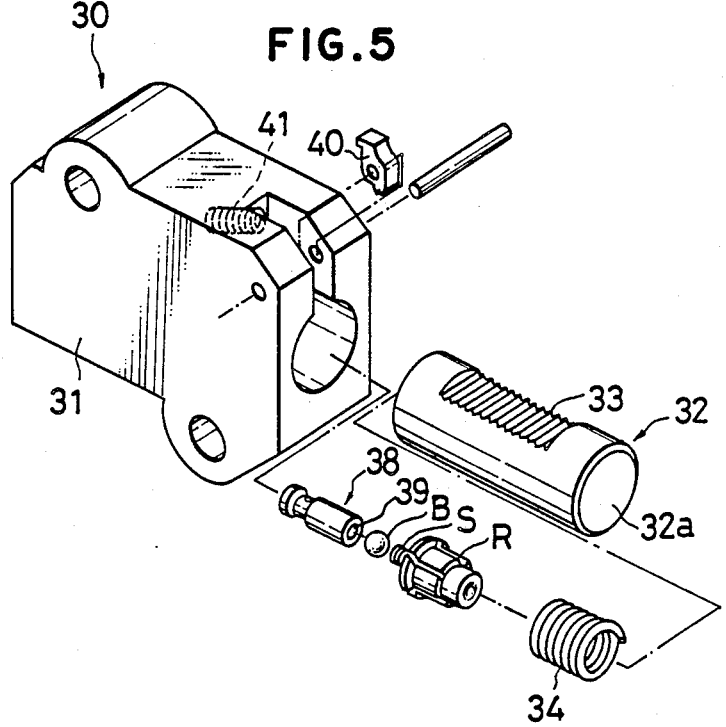
FIG. 5 is an exploded perspective view of the tensioner of FIG. 4.

Referring to FIGS. 4 and 5, there is shown in sectional and perspective views a tensioner which constitutes a second embodiment of the invention, wherein a hollow cylindrical plunger 32 which is open at one end and slidably fitted in a housing 31 is formed with a rack 33 on the circumferential surface thereof. A spring 34 is fitted in the plunger 32 between the closed end of the plunger 32 and the housing 31 to bias the plunger 32 in a protruding direction, pressing an end face 32a against arm 15 by the biasing force to impart tension to a chain C.

Oil passages 37 and 39 are formed in the housing 31 and a ball seat 38 to supply an oil chamber 36 in the plunger 32 with oil pressure from an oil pump or other oil pressure source, not shown. Check ball B is biased toward the ball seat 38 by a ball spring S which abuts at one end against a retainer R to form a ball-type check valve and permits oil flow into the oil chamber 36 from the passage 39 while blocking oil flow in the reverse direction.

The rack 33, formed on the outer surface of the plunger 32 as mentioned before, meshes with a ratchet 40 which is rotatably supported in the housing 31 and biased by spring 41 in a direction opposite to the aforementioned protruding direction. Thusly, rack 33, ratchet 40 and spring 41 constitute a mechanical no-return mechanism of incremental steps.

Immediately after starting the engine, the oil chamber 36 is not sufficiently filled with oil because of the time lag of the oil pressure supply from the oil pressure source, so that the plunger 32 tends to retract under the influence of reaction of the chain C. However, as mentioned hereinbefore, retraction of the plunger 32 is blocked stepwise by meshing engagement of the rack 33 with the ratchet 40, preventing slacking of the chain C.

As soon as the oil pressure in the oil chamber 36 is elevated sufficiently, the above-described check ball mechanism operates as a hydraulic check ball tensioner with the stepwise no-return function.

Figure 6:
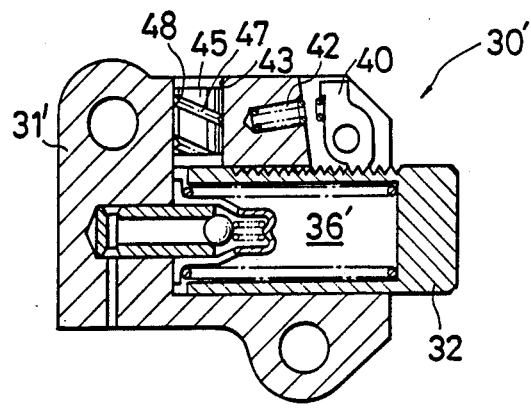
FIG. 6 is a sectional view of a hydraulic ball-type check valve tensioner of a third embodiment combining a ratchet and an orifice.

Referring to FIG. 6, there is shown a hydraulic ball-type check valve tensioner 30; in a third embodiment of the invention constructed to discharge excessive oil pressure from the oil chamber 36 through an orifice in addition to the retracting function.

A bore 43 formed in the housing 31, communicates the oil chamber 36' with the outside, and a plug 45, which has a helical groove 47 on its circumferential surface, presses into the bore 43 to form an orifice 48 bounded by the wall surface of the bore 43 and the helical groove 48.

In this embodiment with the orifice 48, oil discharges through the orifice 48 when the chain is excessively tensioned, thereby preventing generation of unreasonably high oil pressure and rendering the plunger 32 retractable. In this instance, the ratchet-type no-return mechanism may employ a ratchet 40 biased by a spring 42 in a direction opposite to the protruding direction of the plunger 32. Ratchet 40 has a slower back-lash immediately after advancement by on tooth of the rack due to its larger inertia as compared with conventional counterparts.

With this tensioner 30', the ratchet 40 performs the stepwise no-return function (permitting a certain degree of retraction in case it has a slow back-lash) before supplying an appropriate oil pressure to the oil chamber 36', and maintaining the tension of the chain by the stepless no-return function after an appropriate oil pressure is applied. Besides, the plunger 32 is retractable by the provision of the orifice 48 (and the backlash of the ratchet 40 if any) in case an unreasonably high reaction forced is imposed thereon thereby precluding overtensioning of the chain as well a damage to the tensioner.

Figure 7:
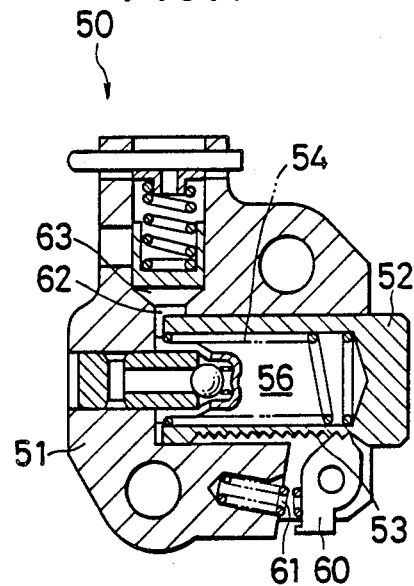
FIG. 7 is a sectional view of a hydraulic ball-type check valve tensioner of a fourth embodiment combining a ratchet and a relief value.
Figure 8:
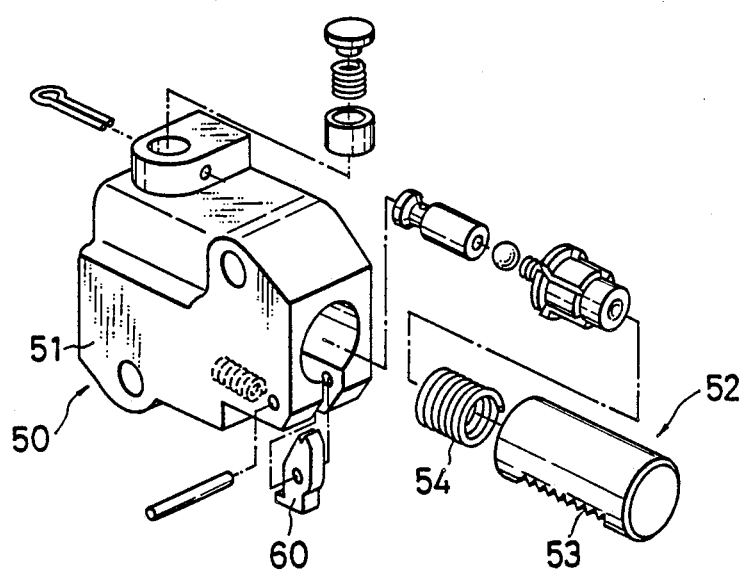
FIG. 8 is an exploded perspective view of the tensioner of FIG. 7.

FIGS. 7 and 8 illustrate a hydraulic ball-type check valve tensioner 50 according to a fourth embodiment of the invention, which employs the ratchet of the second embodiment on a tensioner 10 with a relief valve of the first embodiment.

Since this embodiment is a combination of the foregoing embodiments, details of its construction are omitted in the following description to avoid unnecessary repetitions. A rack 53 is formed on the circumferential surface of the plunger 52 in a position confronting the relief valve, and meshed with a ratchet 60 which is rotatably supported on a housing 51 and biased by a spring 61 in a direction opposite to the protruding direction. Similar to the third embodiment, this ratchet mechanism is desired to have a slower back-lash than conventional counterparts, even after an advancement by one tooth of the rack.

In case chain slackening takes place under engine driving condition, the plunger 52 is protracted by the biasing action of the spring 54, and the ball-type check valve operates in the same manner as in the foregoing embodiments. At the same time, if the plunger 52 advances to a degree exceeding one tooth of the rack, the rack 53, which is meshed with the ratchet 60, advances to prevent slackening of the chain C. Even after an advancement of one tooth, the rack has a play to return to an extent corresponding to the amount of back-lash of the ratchet, permitting retraction of the plunger 52. When an excessively high oil pressure occurs in the oil chamber 56, the sleeve 63 is retracted by the oil pressure which prevails in the auxiliary oil chamber 63 through oil passage 62. In this manner, the relief valve mechanism discharges excessive oil to maintain the pressure in the oil chamber a&. an appropriate level.

Figure 9:
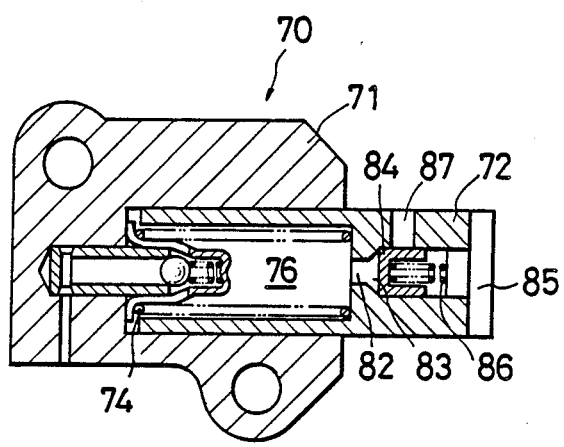
FIG. 9 is a sectional view of a hydraulic ball-type check valve tensioner of a fifth embodiment which is provided with a relief valve in the plunger.

Referring now to FIG. 9, there is illustrated in a sectional view a fifth embodiment of the invention, namely, a hydraulic tensioner 70 with a relief valve on a plunger 72.

The hollow cylindrical plunger 72 which is slidably fitted in a housing 71 and has an opening at one end is provided with an oil passage 82 in communication with an oil chamber 76. An auxiliary oil chamber 83 which is formed by closing the other end of the plunger 72 with a plug 85 is communicated with the oil chamber 76 through the oil passage 82. A sleeve 84 is slidably fitted in the auxiliary oil chamber 83, and a spring 86 is interposed between the sleeve 84 and the plug 85 to bias the sleeve 84 into a depressed position. The plunger 72 is further provided with a radial discharge port 87 which is communicated with the auxiliary oil chamber 8 when the sleeve 84 is pushed back against the biasing force by the oil pressure load in the oil chamber 76, thereby forming a relief valve mechanism. On the other hand, similarly to the first embodiment, the housing 71 is provided with a ball-type check valve and a spring 74 for biasing the plunger 72 in the protruding direction. Of course, the ratchet mechanism of FIGS. 4, 5 and 6 may be employed in addition to the relief valve mechanism.

With the relief valve mechanism of this embodiment, the sleeve 84 is also retracted against the biasing action of he spring 86 when an excessively high oil pressure is generated in the oil chamber 76 by a load acting in the plunger-retracting direction, lowering the oil pressure in the oil chamber 76 and auxiliary oil chamber 83. Upon further retraction, the auxiliary oil chamber 83 is communicated with the discharge port 87 to open the valve, and as a result the oil is discharged therethrough to maintain the oil pressure in the oil chamber 76 at a predetermined value in cooperation with the oil supplying operation of the check ball mechanism.

In the above-described relief valve mechanisms, an orifice may be provided in the oil passage 22 or 62 which communicates the oil chamber 16 o 56 with the auxiliary oil chamber 23 or 63, or in the discharge port 27 or 67, or in the oil passage 82 or discharge port 87 in the fifth embodiment to prevent abrupt pressure drops in the oil chamber 16, 56 or 76.

The discharging oil pressure can be set at a predetermined value by adjusting the pressure receiving area of the sleeve in the auxiliary oil chamber, the spring coefficient of the biasing spring and the stroke of the sleeve relative to the position of the discharge port.

A relief valve with quick response to excessively high oil pressures can be obtained by providing the discharge port in such a position that it is opened immediately after a displacement of the sleeve.

As mentioned hereinbefore, the tensioner according to the present invention can maintain constant tension by a combination of relief valve and check valve mechanisms which are adapted to operate the plunger appropriately in conformity with slackening or overtensioning of a chain or a similar power transmission device.

Further, since there is no possibility of oil leaks from the oil chamber when the engine is at rest or idling, it becomes possible to prevent fluttering of the chain at the time of restart and to suppress its noises to a marked degree.

Besides, the provision of a sleeve type relief valve for oil discharge has a number of advantageous effects such as improved sealability in the "valve closed" state, improved accuracy of valve opening timing, and reduction of vibrational oil leaks.

Even when the oil pressure is low or unavailable, the plunger can be moved forward and backward appropriately and safely by the use of the ratchet mechanism with the stepwise noreturn function, blocking retraction of the protracted plunger to maintain the tension of the chain.

In a case where a relief valve is provided on the plunger as in the fifth embodiment, it becomes possible to save the spaces of the tensioner itself to provide a compact construction.

Accordingly, when used for a vehicle engine or the like, the chain vibrations under low oil pressure conditions, for example, immediately after an engine start or in an idling operation can be suppressed to lower the engine noises.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A hydraulic ball-type check valve tensioner having a plunger internally provided with a fluid chamber and slidably fitted in a housing in association with a spring biasing said plunger in a protruding direction, a passage formed in said housing communicating said chamber with and external source of fluid pressure, and a check ball mechanism provided between said housing and said chamber to permit fluid flow into said chamber while blocking flow in the reverse direction, wherein the improvement comprises:

a rack formed on the outer surface of said plunger; and a ratchet rotatably supported on said housing in meshing engagement with said rack and biased by a spring in a direction opposite to said protruding direction.

2. A fluidic tensioner for a wrapped power transmission device between rotating members, comprising, in combination:

a housing having first and second fluid-filled chamber therewithin;

a passage formed in said housing communicating said second chamber with and external source of fluid pressure;

a plunger slidably fitted in said first chamber and extending therefrom for bearing against said device to regulate the tension between the rotating members;

a spring biasing said plunger in a protruding direction toward the power transmission device;

a ball-type check valve between said first and second chambers for transferring fluid from said first chamber into said second chamber, and for blocking fluid transfer from said second chamber into said first chamber; and no-return means having a rack formed on the outer surface of said plunger, a ratchet rotataably supported on said housing for meshing with said rack, and a sping biasing said ratchet in a direction opposite of said protruding direction.

* * * * *